UNITED STATES PATENT OFFICE.

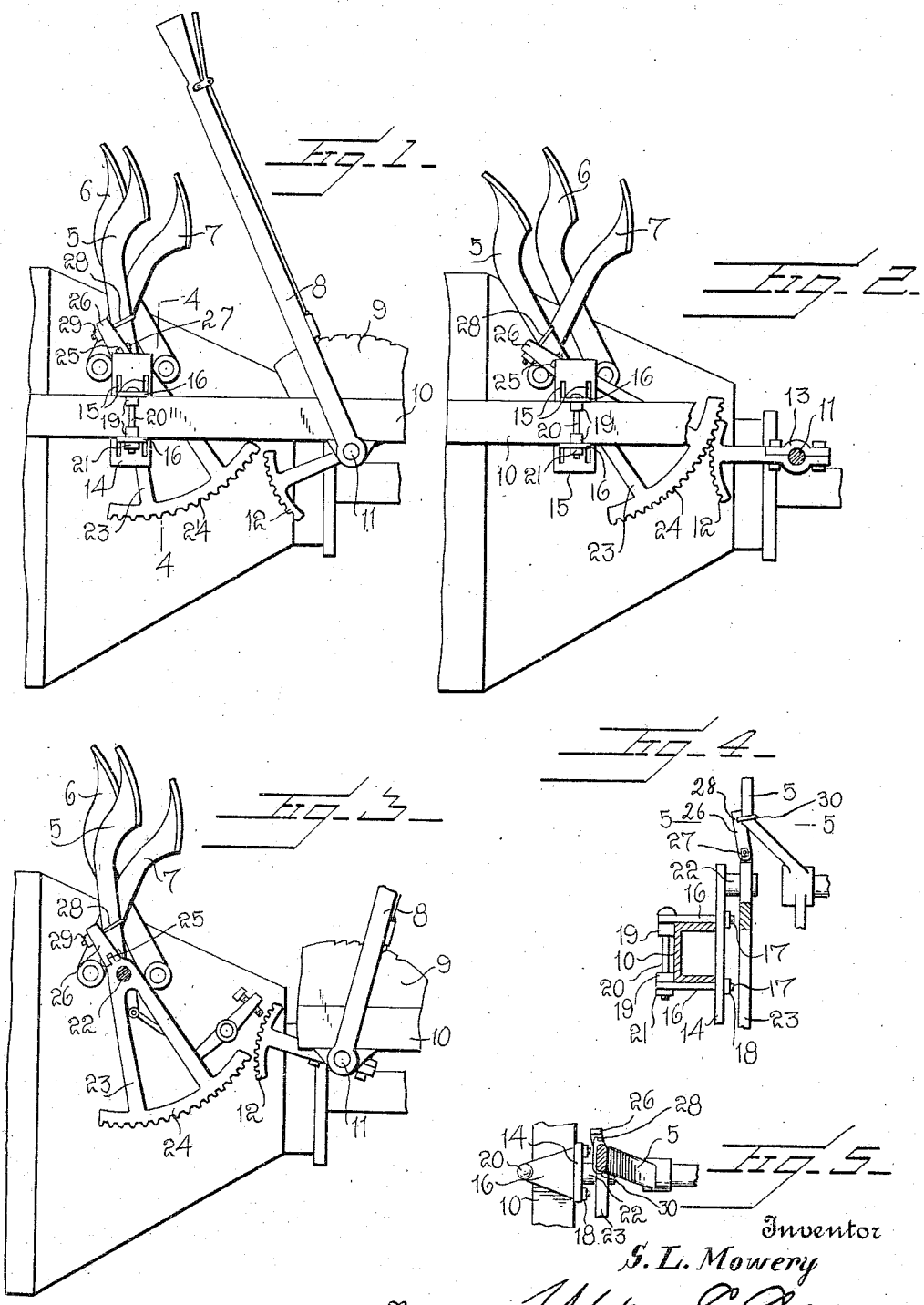

STERLING L. MOWERY, OF NESCOPECK, PENNSYLVANIA.

TRANSMISSION-CLUTCH CONTROL.

1,296,837.          Specification of Letters Patent.      Patented Mar. 11, 1919.

Application filed June 19, 1918. Serial No. 240,758.

*To all whom it may concern:*

Be it known that I, STERLING L. MOWERY, a citizen of the United States, residing at Nescopeck, in the county of Luzerne and State of Pennsylvania, have invented certain new and useful Improvements in Transmission-Clutch Controls, of which the following is a specification, reference being had to the accompanying drawings.

This invention relates to a transmission gear control, and has for its general object to provide means for locking the gear shifting pedal of a certain type of speed controlling transmission, in its low speed position, by drawing the brake lever back to a neutral position.

It is another object of the invention to provide means for locking the speed controlling pedal, from shifting from a neutral position to a high speed position, when the emergency brake lever is moved rearward to apply the brakes.

And it is also an important object of the invention to provide a speed control mechanism as above characterized, the several parts of which are of very simple form and can be easily and quickly applied in operative position without necessitating any alteration in the mounting or arrangement of the control levers.

With the above and other objects in view the invention consists in the improved combination, construction and relative arrangement of the several parts as will be hereinafter more fully described, subsequently claimed and illustrated in the accompanying drawing in which similar reference characters designate corresponding parts throughout the several views, and wherein:—

Figure 1 is a side elevation of my improved transmission speed control showing the speed controlling pedal in its neutral position and the emergency brake lever in its fully released position;

Fig. 2 is a similar view showing the speed controlling pedal locked in its low speed position;

Fig. 3 is a side elevation showing the relative positions of the parts when the emergency brakes have been applied;

Fig. 4 is a transverse section taken on the line 4—4 of Fig. 1; and

Fig. 5 is a section taken on the line 5—5 of Fig. 4.

Referring in detail to the drawing, 5 designates the speed controlling pedal, 6 the brake pedal, and 7 the reverse pedal of a power transmission control mechanism such as is used on a certain type of motor vehicles.

The emergency hand brake lever 8 is provided with the usual spring pressed locking dog for engagement with a toothed quadrant 9 suitably secured to the longitudinal bar 10 of the frame or chassis of the machine. Upon the emergency brake shaft 11, a gear segment 12 is adjustably mounted or arranged, said gear segment having an arm provided with a bearing for engagement upon one side of the shaft 11, a cap plate or half bearing 13 being engaged upon the opposite side of the shaft and securely bolted to said arm, whereby the gear segment is held in its adjusted position.

Upon the inner side of the frame bar 10, a vertically disposed plate 14 is arranged, said plate having spaced parallel slots 15 therein and projecting above and below the frame bar. Attaching plates 16 are engaged upon the upper and lower sides of the frame bar 10 and are provided with spaced bolts 17 to extend through the slots 15 in the plate 14, suitable tightening or clamping nuts 18 being threaded upon the ends of said bolts. Each of the plates 16 at its opposite end is formed with a sleeve or boss 19 projecting beyond the inner side of the frame bar. These sleeves receive the vertically disposed clamping bolt 20, upon the lower end of which a suitable clamping nut 21 is threaded. The plate 14 is provided at its upper end with an inwardly projecting bearing stud or gudgeon 22. Upon this stud 22, an arm 23 is loosely mounted for turning movement, said arm having an arcuate rack or toothed sector 24 formed upon one of its ends. This toothed sector is disposed in concentric relation to the bearing stud 22, and the plate 14 is vertically adjusted to position this bearing stud in coaxial alinement with the operating shaft, of the speed controlling mechanism upon which the pedal 5 is secured. The major portion of the arm 23 extends downwardly from the bearing stud 22, and above said stud the end of the arm is formed with an ear 25 adapted for engagement in the bifurcated end of a member 26, which forms an extension of the arm 23. This end of the section or member 26 is pivotally or hingedly connected to the ear 25 by means of a bolt 27 so that the member 26 has a transverse, pivotal movement upon the upper end of the arm 23. The other end of the member 26 is provided with an opening to receive the bolt 28. Upon one end of this bolt a retaining nut 29 is threaded, while the other end thereof is formed into a yoke 30 for engagement upon the pedal 5.

In Fig. 1 I have shown the emergency brake lever 8 as thrown to its fully released position and the pedal 5 in neutral position. In this type of transmission gearing the pedal 5 is urged toward its high speed position (not shown) by springs and the pedal must be held in its neutral position or shifted to the position shown in Fig. 2 by the pressure exerted by the foot of the operator. When that pressure is relieved, the pedal is urged from the low speed position shown in Fig. 2 to the neutral position shown in Fig. 1 and through the neutral position to its high speed position, (not illustrated). As before stated, the object of my invention is to provide means for locking the pedal 5 in its low speed position, as illustrated in Fig. 2, so that the operator need not exert pressure at all times upon this pedal when running at low speed or when the pedal is in neutral.

In the operation of the device as above described, when it is desired to drive at low speed, the operator forces the pedal 5 forward, and in such movement of the pedal, the toothed sector 24 is thrown rearward and upward to the position seen in Fig. 2 and simultaneously the hand brake lever is drawn rearward and, the gear segment 12 on the brake shaft is raised and the teeth thereof are interlocked with the teeth of the sector 24. The lever 8 being locked to the quadrant 9, it will thus be apparent that the pedal is retained or locked in its low speed position. When it is desired to change the speed to neutral or high, the lever 8 is moved back to the position shown in Fig. 1, thus lowering the gear segment 12 and releasing the pedal 5 so that it may return to its neutral position and be shifted to its high speed position. In applying the emergency brakes, the hand lever 8 is drawn rearwardly to the position seen in Fig. 3. The pedal 5 is not operated, and it will therefore be seen that in this movement of the hand lever, when the gear segment 12 is moved forward and upward it will not engage the teeth of the sector 24.

From the foregoing description, taken in connection with the accompanying drawing, the construction, manner of operation and several advantages of my invention will be clearly and fully understood. The device provides a simple and effective means for locking the speed controlling pedal against movement when driving at low speed, but permits the ready release of the pedal when it is desired to change the speed to high or shift the pedal and the brake lever to neutral position. The several parts above referred to all are of very simple form, and can be readily applied in operative position without necessitating any structural alterations or rearrangement of the control levers of the ordinary power transmission control such as is in general use upon motor vehicles. Owing to the simplicity of the device, it will also be appreciated that the same can be produced at relatively small manufacturing cost.

While I have herein shown and described the preferred construction and arrangement of the several elements, it is to be understood that the device is susceptible of considerable modification therein and I, therefore, reserve the privilege of adopting all such legitimate changes as may be fairly embodied within the spirit and scope of the invention as claimed.

I claim:—

1. The combination with the speed controlling pedal and emergency brake lever of an automobile, of a toothed sector rotatably mounted upon the vehicle frame, means operatively connecting said sector to the said pedal, and means operated by the brake lever to coact with said toothed sector when the pedal is actuated to change speed whereby the pedal is locked against movement to neutral position when the pressure on the pedal is released.

2. The combination with the speed controlling pedal and emergency brake lever of an automobile, of a toothed sector rotatably mounted upon the vehicle frame, means operatively connecting said sector to the said pedal, a gear segment fixed upon the brake lever shaft and movable in the operation of said lever into engagement with the teeth of the sector when the pedal is actuated to change speed whereby the pedal is locked against movement to neutral position when the pressure on the pedal is released.

3. The combination with the speed controlling pedal and emergency brake lever of an automobile, of a toothed sector rotatably mounted upon the vehicle frame, a member pivotally connected at one of its ends to said sector for transverse movement relative thereto, means operatively connecting the other end of said member to the pedal, and means operated by the brake lever to coact with said toothed sector when the pedal is actuated to change the speed whereby the pedal is locked against movement to a neutral position when the pressure on the pedal is released.

4. The combination with the speed controlling pedal and emergency brake lever of an automobile, of means carried by said parts and interlocking with each other, to prevent a reverse movement of the pedal when it has been shifted to a low speed position and the brake lever has been simultaneously shifted to a neutral position but permitting the independent movement of the pedal and a movement of the brake lever, from neutral position to its brake applying position when the pedal and brake lever have not been simultaneously shifted.

In testimony whereof I hereunto affix my signature in the presence of two witnesses.

STERLING L. MOWERY.

Witnesses:
JOHN J. KELLEY,
DAISY TEMPLE.